US006943952B2

(12) United States Patent
Souparis

(10) Patent No.: US 6,943,952 B2
(45) Date of Patent: Sep. 13, 2005

(54) OPTICAL SECURITY COMPONENT

(75) Inventor: Hugues Souparis, Nogent-sur-Marne (FR)

(73) Assignee: Hologram Industries (SA) (FR)

( * ) Notice: Subject to any disclaimer, the term of this patent is extended or adjusted under 35 U.S.C. 154(b) by 0 days.

(21) Appl. No.: 10/960,727

(22) Filed: Oct. 7, 2004

(65) Prior Publication Data

US 2005/0094274 A1 May 5, 2005

Related U.S. Application Data

(63) Continuation of application No. PCT/FR03/00911, filed on Mar. 21, 2003.

(30) Foreign Application Priority Data

Apr. 8, 2002 (FR) .......................................... 02 04359
Feb. 3, 2003 (FR) .......................................... 03 01222

(51) Int. Cl.[7] .............................................. G02B 1/10
(52) U.S. Cl. ...................... 359/586; 359/587; 359/580; 359/566
(58) Field of Search ......................... 359/1, 15, 2, 586, 359/587, 584, 580, 576, 572, 566, 567, 900

(56) References Cited

U.S. PATENT DOCUMENTS 4,856,857 A 8/1989 Takeuchi et al.
5,810,957 A * 9/1998 Boswell ...................... 156/220
5,882,463 A 3/1999 Tompkin et al.
6,452,698 B1 * 9/2002 Vlcek et al. .................. 359/3
2004/0179266 A1 * 9/2004 Schilling et al. ............ 359/558

FOREIGN PATENT DOCUMENTS

| | | | |
|---|---|---|---|
| EP | 0743192 | A1 | 11/1996 |
| EP | 0869408 | A1 | 10/1998 |
| FR | 2509873 | A | 1/1983 |
| GB | 2126949 | A | 4/1984 |
| WO | WO 01/07268 | A1 | 2/2001 |

* cited by examiner

*Primary Examiner*—Fayez G. Assaf
(74) *Attorney, Agent, or Firm*—DLA Piper Rudnick Gray Cary US LLP

(57) ABSTRACT

An optical security component for authenticating a document or a product including a transparent plastic film embossed to form an embossed surface and to have at least one diffraction grating; a layer of dielectric material of high optical index at least partially coated on the embossed surface and producing a colored effect of a first color for a first orientation of the component and a second different color for orientation perpendicular to the first orientation; a low optical index layer coated on a side opposite the viewing direction of the dielectric material; and a colored contrast layer having transparent zones and colored zones on the low optical index layer.

22 Claims, 2 Drawing Sheets

OPTICAL SECURITY COMPONENT

RELATED APPLICATION

This is a continuation of International Application No. PCT/FR03/00911, with an international filing date of Mar. 21, 2003 (WO 03/085425, published Oct. 16, 2003), which is based on French Patent Application Nos. 02/04359, filed Apr. 8, 2002, and 03/01222, filed Feb. 3, 2003.

FIELD OF THE INVENTION

This invention pertains to an active security component. More particularly, this invention relates to an optical security component that authenticates a document or product.

BACKGROUND

The general principle of security components is described in FR 2509873. It describes a colored subtractive diffraction filter comprising an optical medium with a variable refraction index of thickness (t) and minimum periodicity (d) in relation to the wavelength of the incident light. The filter is subject to certain constraints with regard to: 1) the relative refraction indices of the internal structure and of its environment, 2) the relative values of the wavelength of the incident light in relation to the periodicity, and 3) the relative refraction indices of the optical medium and of its environment.

That filter produces at the same time color subtraction reflection spectra sensitive to angles and color subtraction transmission spectra conforming to these physical parameters. Such a component produces a variable colored effect as a function of the lighting and viewing directions. The component has, e.g., a greenish appearance with certain orientations and a reddish appearance with other orientations for a given grating type. However, these color variations are subtle and sometimes difficult to detect with the naked eye (independently of machine readability).

The use of such a component for security marking therefore requires that persons who must verify the authenticity of the product or the document are able to verify in a clear manner without ambiguity that the anticipated effects were produced even under lighting conditions that are less than optimal.

Also known are components producing holographic effects such as U.S. Pat. No. 4,856,857 and U.S. Pat. No. 5,992,463, as well as EP 743192 and WO 01/07268.

Also known is GB 2,126,949. It describes an authentication component having an optical security component the high index layer of which is first coated with a low optical index layer and then by a contrast layer. That component produces color change effects as a function of orientation upon rotation in relation to an axis perpendicular to the surfaces. Nevertheless, these effects are sometimes difficult to discern.

SUMMARY OF THE INVENTION

This invention relates to an optical security component for authenticating a document or a product including a transparent plastic film embossed to form an embossed surface and to have at least one diffraction grating, a layer of dielectric material of high optical index at least partially coated on the embossed surface and producing a colored effect of a first color for a first orientation of the component and a second different color for orientation perpendicular to the first orientation, a low optical index layer coated on a side opposite the viewing direction of the dielectric material, and a colored contrast layer having transparent zones and colored zones on the low optical index layer.

BRIEF DESCRIPTION OF THE DRAWINGS

The present invention will be better understood from the description below of a nonlimitative example of implementation with reference to the attached drawings in which.

DETAILED DESCRIPTION

Figure 1:
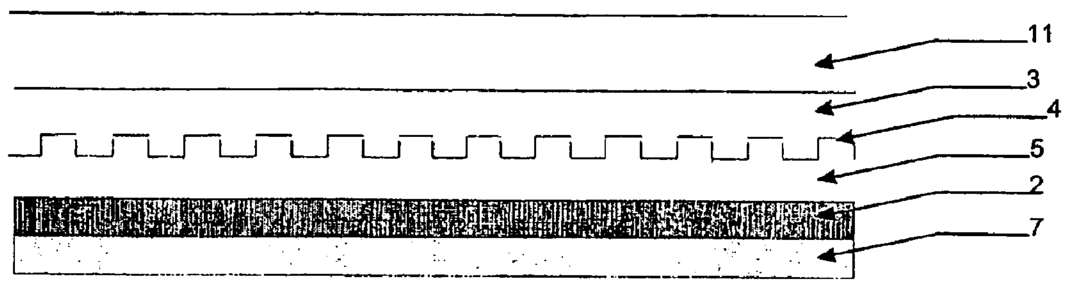
FIG. 1 is a sectional view of an optical component according to aspects of the invention.

It will be appreciated that the following description is intended to refer to specific embodiments of the invention selected for illustration in the drawings and is not intended to define or limit the invention, other than in the appended claims.

This invention improves the optical performance of the components of the state of the art by improving the readability of the coloration changes. This invention in its most general sense pertains to an optical security component, the high index layer of which is first coated by a low optical index layer and then by a colored contrast layer. The colored layer has the unexpected effect of significantly increasing the coloration differences upon changes in orientation.

According to one aspect, the contrast layer has transparent zones and colored zones. Certain of the zones preferably have a recognizable form. The forms can be alphanumeric characters, microlettering, geometric figures, drawings, photographs or the like. The colored layer is preferably obtained with black pigments.

According to one aspect, the component has a diffusion layer between the stamped surface and the viewing surface. The purpose of the layer is to limit specular reflection.

According to another aspect, the component has the form of a thread of a width comprised between about 1.2 and about 4 millimeters.

Turning to the Drawings, FIG. 1 represents a view along a sectional plane. The component is formed by a polyester film coated with a layer of stamping varnish (3) embossed by stamping in a known manner for the creation of holograms or diffraction structures intended for the authentication of documents. The stamped surface is coated by vacuum depositing a layer of a transparent dielectric material (4) with a high optical index, e.g., zinc sulfide (ZnS) or the like, then by application of a low optical index layer (close to the index of the stamping varnish). The component then comprises a colored layer (2) arranged behind the low index layer. This layer is a varnish layer comprising black pigments.

The assembly prepared in this manner is then coated with an adhesive film (7) deposited, e.g., by coating, complexing, laminating or the like.

The component produced in this manner can then be affixed to a document or product to be protected, e.g., by gluing or the like.

It can also be sealed between an object or a document and a sealing film protecting the object or the document, and enabling detection of any attempt to remove this film.

Figure 2:
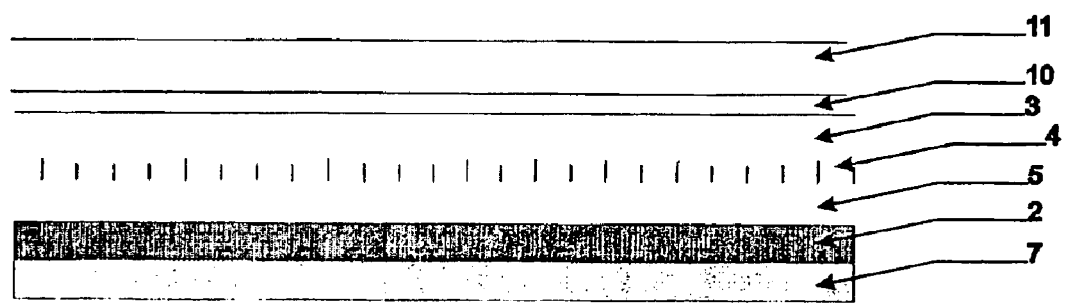
FIG. 2 is a sectional view of an aspect of the invention.

FIG. 2 shows a variant of implementation for the creation of a hot marking film or a transfer film. The stamping varnish (3) is layered on a detachment layer (10), which is itself supported by a transparent film (11), e.g., a polyester film. The contrast layer is positioned behind the low optical index layer.

In one particular application of the invention, the optical component is created in the form of a thread with a thickness of at least about 5 mm. Such a component is intended for the creation of security documents having opposing surface intended for a stamping ensuring identification of a document formed from the paper. The component according to the invention is placed between the two surfaces of the paper as a security characteristic. It is positioned at least partially between the surfaces of the paper. The visible parts comprise between about 10 and about 50% of the surface of the optical component. The visible parts form a motif, a design or repetitive signs.

Figure 3:
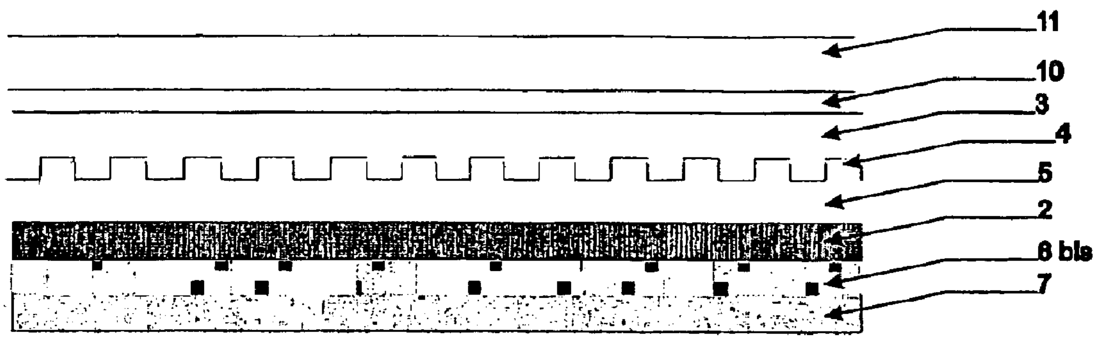
FIG. 3 is a sectional view of another aspect of the invention with an additional completely metallized layer.
Figure 4:
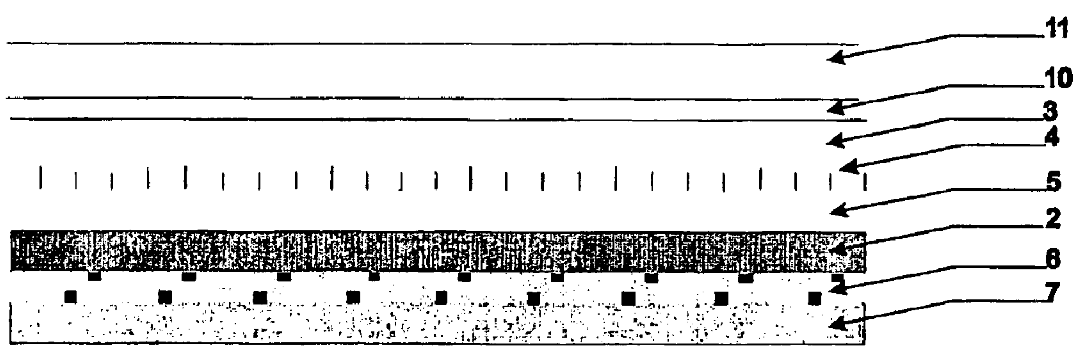
FIG. 4 is a sectional view of another aspect of the invention with an additional partially metallized layer.

FIGS. 3 and 4 represent two other variants of implementation comprising an intermediary layer respectively continuous (6) or discontinuous (6 bis), positioned on the adhesive layer (7).

Layer (6, 6 bis) is formed in a first example in a metallic layer the presence of which can be monitored by machine, implemented notably for a fiduciary application.

Layer (6, 6 bis) is formed in a second example by a reflecting layer which, when the component is inserted in a thin (noncontinuous opaque) medium, considerably reduces the visibility of the component when viewing the back of the component by reflecting the light in a diffuse manner rather than absorbing it. This is the case, e.g., of the thread in a banknote which must be as non-perceptible as possible when observing the verso of the note (the optical component being active in the recto view) (principal application: fiduciary).

Layer (6, 6 bis) is formed in a third example by a partially metallized layer in a manner to add a complementary security. This partial metallization, optionally designed with reference to the stamping of the opaque layer or with the motif of the optical component, of significant characters such as alphanumeric characters, microlettering, a logo, geometric figures or any other design or photo (principal application: identity or protection of trademarks).

The security of this particular optical component is based on the observation at zero order of the grating. Generally speaking, at zero order "direct reflection" a grating acts like a mirror. However, the particular grating used in this invention acts at zero order like a subtractive filter due to the alternation of the different indices. In contrast, when a metallic layer (6, 6 bis) is added behind the low index transparent layer (5), the effect of the subtractive filter disappears and the mirror effect is restored.

This characteristic makes it very easy to design motifs on a uniform grating surface by combining the localized stamping of the contrast layer (2) on the areas where the optical effect must be visible and the visible metallization (6, 6 bis) in the unstamped zones of the layer (5).

This layer (6, 6 bis) is formed in a fourth example by a layer reacting to the laser in manner to allow individual personalization of the optical component. It is again possible for this layer to be a metallic layer. In this specific case it is preferred to add a layer of pigment which will be stripped off during the personalization or to tint the adhesive layer. This layer is especially advantageous in applications related to identity.

This layer (6, 6 bis) is formed in a fifth example by a colored layer (of a color different from the contrast layer). This color visible through the stamped pattern of the contrast layer can have one of the following characteristics: thermochrome color, transparent in the visible light spectrum but which can be made visible in UV light, or a luminescent layer. A similar effect can be obtained by incorporating this tint in the adhesive layer.

The invention can be implemented under three different types of products: thread, track or patch. Thus, it can be used to make the following secure:

- a banknote (fiduciary domain) in which the security is intrinsic to the paper,
- an identity document (passport, identity card) in which the security is brought to the document,
- a product (protection of trademarks) in which the security is brought either to the product itself or to the packaging.

This improvement can be applied to transfer films (hot or cold) as well as to labeling films or threads.

What is claimed is:

1. An optical security component for authenticating a document or a product comprising:

- a transparent plastic film embossed to form an embossed surface and to have at least one diffraction grating;
- a layer of dielectric material of high optical index at least partially coated on the embossed surface and producing a colored effect of a first color for a first orientation of the component and a second different color for orientation perpendicular to the first orientation;
- a low optical index layer coated on a side opposite a viewing direction oriented from the transparent plastic film to the dielectric material; and
- a colored contrast layer having transparent zones and colored zones on the low optical index layer.

2. The optical component according to claim 1, wherein the contrast layer and the low optical index layer are merged.

3. The optical component according to claim 2, wherein certain of the zones have a recognizable form.

4. The optical component according to claim 1, wherein the contrast layer has transparent zones and colored zones.

5. The optical component according to claim 1, wherein the colored layer comprises black pigments.

6. The optical component according to claim 1, further comprising a diffusing layer arranged between the stamped surface and the viewing surface.

7. The optical component according to claim 1, in the form of a thread of a width between about 1.2 and about 4 millimeters.

8. The optical component according to claim 1, further comprising an intermediary layer formed by a metallic layer the presence of which can be monitored by machine.

9. The optical component according to claim 8, wherein the intermediary layer is continuous.

10. The optical component according to claim 8, wherein the intermediary layer is discontinuous.

11. The optical component according to claim 1, further comprising an intermediary layer formed by a reflective layer.

12. The optical component according to claim 11, wherein the intermediary layer is continuous.

13. The optical component according to claim 11, wherein the intermediary layer is discontinuous.

14. The optical component according to claim 1, further comprising an intermediary layer formed by a partially metallized layer.

15. The optical component according to claim 14, wherein the intermediary layer is continuous.

16. The optical component according to claim 14, wherein the intermediary layer is discontinuous.

17. The optical component according to claim 1, further comprising an intermediary layer formed by a layer reacting to a laser in a manner to enable individual personalization of the optical component.

18. The optical component according to claim 17, wherein the intermediary layer is continuous.

19. The optical component according to claim 17, wherein the intermediary layer is discontinuous.

20. The optical component according to claim 1, further comprising an intermediary layer formed by a colored layer of a color different from the contrast layer.

21. The optical component according to claim 20, wherein the intermediary layer is continuous.

22. The optical component according to claim 20, wherein the intermediary layer is discontinuous.

* * * * *